United States Patent
Oryo

[11] Patent Number: 5,745,263
[45] Date of Patent: Apr. 28, 1998

[54] COLOR CORRECTING METHOD AND PRINTING APPARATUS IN COLOR PRINTER

[75] Inventor: Akira Oryo, Kanagawa, Japan

[73] Assignee: Sony Corporation, Tokyo, Japan

[21] Appl. No.: 504,154

[22] Filed: Jul. 19, 1995

[30] Foreign Application Priority Data

Jul. 26, 1994 [JP] Japan ............... 6-193552

[51] Int. Cl.[6] ............................................ G03F 3/08
[52] U.S. Cl. ................................... 358/518; 358/520
[58] Field of Search ....................... 358/501, 504, 358/520, 518, 530, 505, 531

[56] References Cited

U.S. PATENT DOCUMENTS 4,758,885  7/1988  Sasaki et al. ............... 358/520
5,185,661  2/1993  Ng ............................. 358/505

*Primary Examiner*—Thomas D. Lee
*Assistant Examiner*—Jerome Grant, II
*Attorney, Agent, or Firm*—William S. Frommer; Alvin Sinderbrand

[57] ABSTRACT

A color correcting method of a color printer is provided. Input image data expressed by lightness (or brightness), saturation, and hue is compared with a color expression range of a color printer similarly expressed by lightness, saturation, and hue. The input image data is used without change as output data with respect to that input image data which is found to overlap the color expression range of the color printer as a result of the comparison. Output data is formed by changing the lightness of the input image data when the data is converted to a point on the outer edge of the color expression range of the color printer with respect to any portion of the input image data which does not overlap with the color expression range of the color printer.

7 Claims, 6 Drawing Sheets

COLOR EXPRESSION
RANGE OF INPUT

COLOR CORRECTING METHOD AND PRINTING APPARATUS IN COLOR PRINTER

BACKGROUND

1. Field of the Invention

The present invention relates to a color correcting method and printing apparatus of a color printer and, more particularly, to a color correcting method and printing apparatus of a color printer for use when a color expression range of an input image is different from a color expression range of the color printer.

2. Background of the Invention

A color expression range of printed matter which is outputted from a color printer is generally narrower than a color expression range of an image which is inputted to the color printer. Such an example is shown in FIG. 1, in which it is assumed that the color expression range of the image which is inputted to the color printer is a color expression range (A) and the color expression range of the printed matter outputted from the color printer is a color expression range (B). FIG. 2 is an explanatory diagram of axes of respective directions in a color space, with brightness or lightness (L) being shown in the vertical direction, saturation (C) being shown in the radial direction, and hue (H) being expressed in the circumferential direction.

The color printer ordinarily expresses colors by using coloring materials comprised of three colors, such as yellow, cyan, and magenta or comprised of four colors, such as the three colors specifically mentioned above and black. A range of a color which can be reproduced is determined by the coloring materials used and the paper to be printed. Such a range corresponds to the color expression range (B) in FIG. 1 which is the color expression range of an output of the color printer.

As shown in FIG. 1, since a difference exists between the color expression range of data which is inputted and the color expression range that can be outputted by the color printer, when data exceeding the color expression range of the output of the color printer is inputted, it is necessary to make the color expression range of the color printer correspond to the color expression range of the input data. Three kinds of methods are known for achieving such correspondence and are referred to as the perceptual matching method, the colormetric matching method, and the saturation matching method. When reproducing the color of the input image data with high fidelity is desired, the colormetric matching method is used.

According to this method, input image data which is out of the color expression range of the output of the color printer is made to correspond to the color expression range of the color printer by changing only the saturation (C) without changing the lightness (L) and hue (H). If it is assumed that the input data is represented by a point (Li, Ci, Hi), when this point is in the color expression range of the output, the point of the same coordinates is set to an output. When the input data point (Li, Ci, Hi) is out of the color expression range, a point Ro which is an intersection of a straight line connecting the point (Li, Ci, Hi) and a point (Li, 0, -) and the outer edge of the color expression range (B) of the color printer is set to a corresponding output. '-' in the term (H) shows the data can be ignored.

According to the above-mentioned method, as shown in FIG. 3, in a region where the saturation (C) largely changes for a change in lightness (L) in the color expression range of the output of the color printer, a large difference in output results in the image printed by the color printer as shown by reference characters $T_1$ and $T_2$ even in the case where a brightness or lightness difference between input image data shown by reference characters $S_1$ and $S_2$ is small. There is, consequently, a drawback in that, when there are successive changes of dark color and light in the regions corresponding to the input image data $S_1$ and $S_2$, a pseudo outline appears in regions shown by the output results $T_1$ and $T_2$, so that an output result, namely, a printed image provided by the printer, is unnatural.

SUMMARY OF THE INVENTION

It is therefore an object of the present invention to provide a color correcting method for a color printer which resolves the above-mentioned problem.

It is another object of the invention to provide a printing apparatus which resolves the above-mentioned problem.

According to an aspect of the present invention, in a color correcting method for a color printer, with respect to a portion of the input image data which overlaps with a color expression range of the color printer expressed by lightness, saturation, and hue the input image data is used as output data for operating the color printer and with respect to a portion of the input image data which does not overlap with the color expression range of the color printer, the lightness of the portion which does not overlap is changed and converted to a point on the outer edge of the color expression range of the color printer, thereby generating converted output data for operating the color printer.

In an embodiment of the present invention, there is provided a printing apparatus including a printing section and a signal processing section. The printing section executes a color printing. The signal processing section performs a predetermined signal processing of the input image data and supplies the processed data to the printing section. The signal processing section compares the input image data and a color expression range expressed by lightness, saturation, and hue of a color printer, supplies a portion of the input image data to the printing section in which the input image data and the color expression range of the printing section overlap on the basis of the comparison result. With respect to a portion of the input image data which does not overlap with the color expression range of the printing section, the signal processing section supplies to the printing section converted or modified data formed by changing the lightness of the input image data when the data is converted to a point on the outer edge of the color expression range of the printing section.

According to the invention, even if the input image data is in a region which exceeds the color expression range of the color printer, a color correction can be executed with any unnaturalness being suppressed.

The above and other objects and features of the present invention will become apparent from the following detailed description and the appended claims when read with reference to the accompanying drawings.

DESCRIPTION OF THE INVENTION

Figure 1:
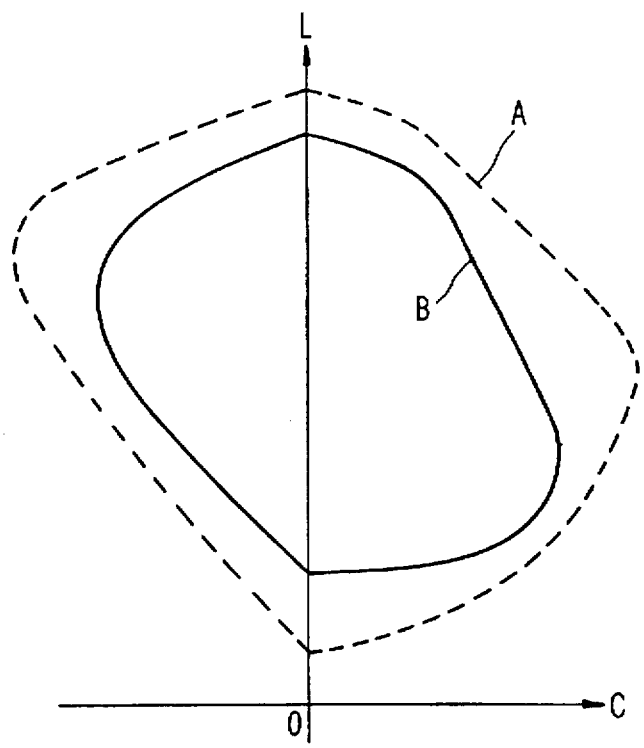
FIG. 1 is a schematic diagram showing an example of a color expression range of input data that differs from a color expression range of output data of a color printer.
Figure 2:
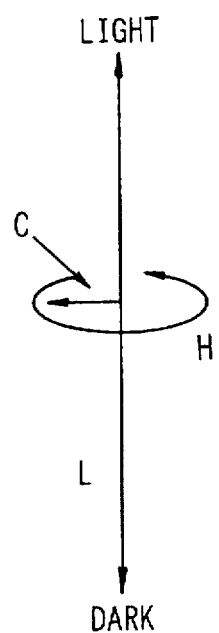
FIG. 2 is a schematic diagram showing how the relation between lightness, saturation, and hue of a color signal may be expressed.
Figure 3:
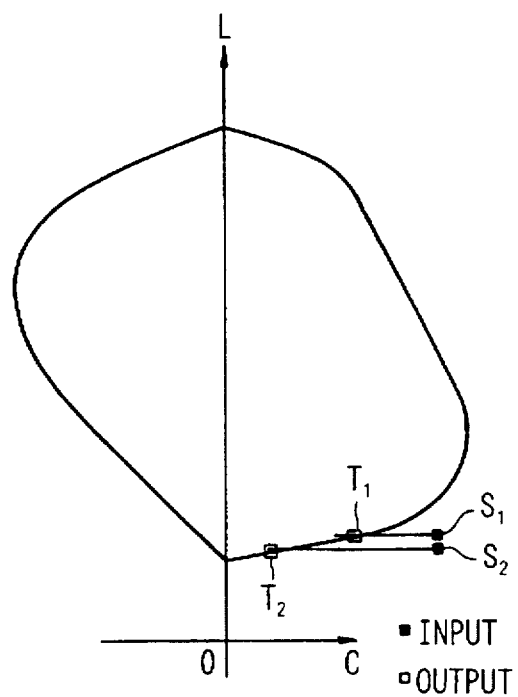
FIG. 3 is a schematic diagram showing how a large difference may occur in output even when a difference between input image data is small.
Figure 4:
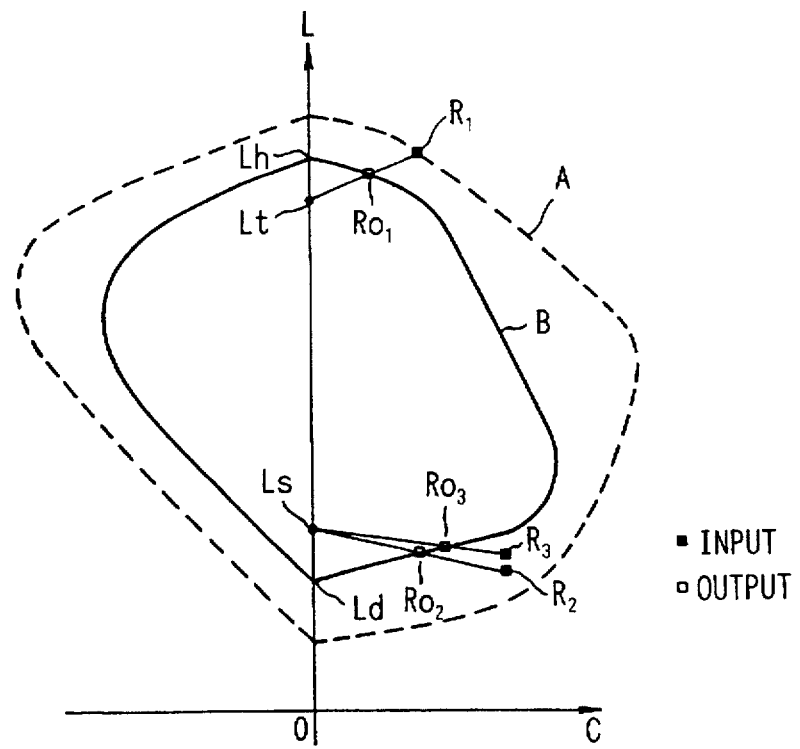
FIG. 4 is a schematic diagram similar to that of FIG. 1, but showing a fundamental idea of a color correcting method in accordance with the invention.

A fundamental idea of a color correcting method of a color printer according to the invention will be broadly described hereinbelow with reference to FIG. 4 of the drawings, in which, in a manner similar to FIG. 1, it is assumed that a color expression range of an image which is inputted to a color printer is set to a color expression range (A) and a color expression range of an output of the color printer is set to a color expression range (B). The lightness (L) at the darkest point in the color expression range (B) is assumed to be Ld and the lightness (L) at the lightest point in the range (B) is assumed to be Lh. The lightness points Ls and Lt in FIG. 4 are points which divide the range (B) into a region between the points Ls and Lt where a change in saturation (C) for a predetermined change in lightness (L) is relatively small, and a region below and above the points Ls and Lt, respectively, where the change in saturation (C) for the predetermined change in lightness (L) is relatively large. The lightness point Ls corresponds to the side where the lightness is small, that is, a point serving as a lower limit. The lightness point Lt corresponds to the side where the lightness is large, that is, a point serving as an upper limit. A method of determining those lightness points Ls and Lt will be described hereinafter.

A data process employed when data outside the color expression range (B) of the output of the color printer is inputted will now be described. In the case where a lightness $L_1$ of data $R_1$ which is inputted to the color printer is (Lt<$L_1$), an output for the input data $R_1$ is shown by the point Ro, at an intersection of a straight line connecting the input data $R_1$ and a point (Lt, 0, -) with the outer edge or perimeter of the color expression range (B). In the case where a lightness $L_2$ of data $R_2$ which is inputted to the color printer is (Ls>$L_2$), an output for the input data $R_2$ is shown by the point Ro$_2$ at an intersection of a straight line connecting the input data $R_2$ and a point (Ls, 0, -) with the outer edge or perimeter of the color expression range (B).

By considering the relation between the output data Ro$_2$ and Ro$_3$ obtained from the color printer in correspondence to input data $R_2$ and $R_3$ in FIG. 4 in the manner described above in accordance with the invention, it will be apparent that, even in a region where the saturation (C) undergoes relatively large changes for the predetermined change in lightness (L) in the color expression range (B) of the output, an output adapted to the change of the input can be obtained. That is, the color correction of the color printer is properly executed for the change of the input.

Figure 5:
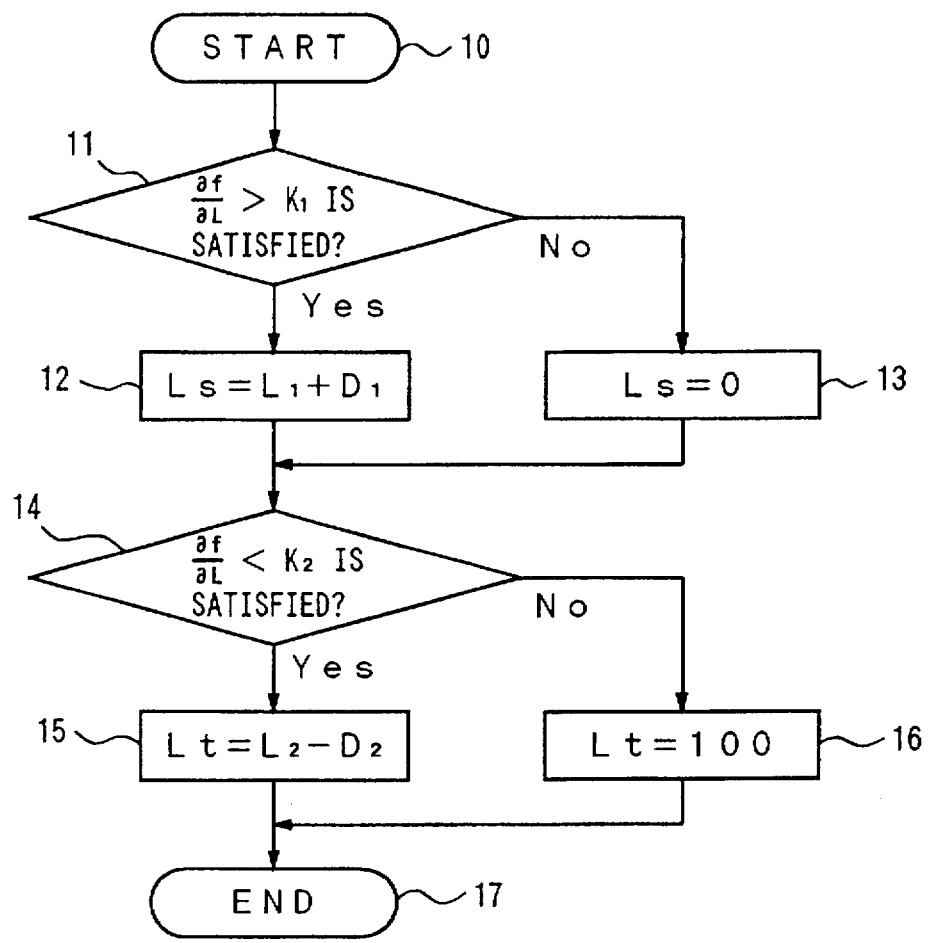
FIG. 5 is a flowchart showing a method for determining points defining the lower and upper limits of lightness within the color expression range of FIG. 4 where the change in saturation is relatively small for a change in lightness.

A method of determining the foregoing lightness points Ls and Lt will be described hereinbelow with reference to a flowchart of FIG. 5. For such purpose, it is now assumed that the outer edge of the color expression range (B) of the output is represented by a function [C=f(L, H)] of the saturation (C), that the lightness (L) is defined within a range of Ld≦L≦Lh and that the hue (H) is defined within a range of 0≦H<2π. Further, it is assumed that the color expression range (B) of the output of the color printer is already known by some means at the time of start step 10.

First, a constant $K_1$ having a positive value is set and a check is made to see whether or not the following expression (1) is satisfied with regard to the constant $K_1$ (step 11). If the expression (1) is satisfied, Ls=$L_1$+$D_1$ is output (step 12) with $L_1$ being set to the maximum value of (L) which satisfies expression (1) below. If expression (1) is not satisfied, Ls=0 is output (step 13). The constants $K_1$ and $D_1$ will be described hereinbelow.

$$\frac{\partial f}{\partial L} > K_1 \quad (1)$$

A constant $K_2$ having a negative value is subsequently set and a check is made to see whether or not there is a case where the following expression (2) is satisfied with respect to the constant $K_2$ (step 14). If there is a case where the expression (2) is satisfied, Lt=$L_2$-$D_2$ is output (step 15) with $L_2$ being set to the minimum value of (L) which satisfies the expression (2). If the expression (2) is not satisfied, Lt=100 is output (step 16). The constants $K_2$ and $D_2$ will be described hereinafter.

$$\frac{\partial f}{\partial L} < K_2 \quad (2)$$

The lightness Ls as a lower limit and the lightness Lt as an upper limit are set by the above-mentioned procedure. A number of images are actually printed out by using the color printer and the printed images are subjectively evaluated and the foregoing constants $K_1$, $K_2$, $D_1$, and $D_2$ are set to the values obtained as a result of such an evaluation. Ordinarily, the constant $K_1$ is set to a value about 5 to 10, the constant $K_2$ is set to a value about −5 to −10, and each of the constant $D_1$ and $D_2$ is set to a value of about 3.

Figure 6:
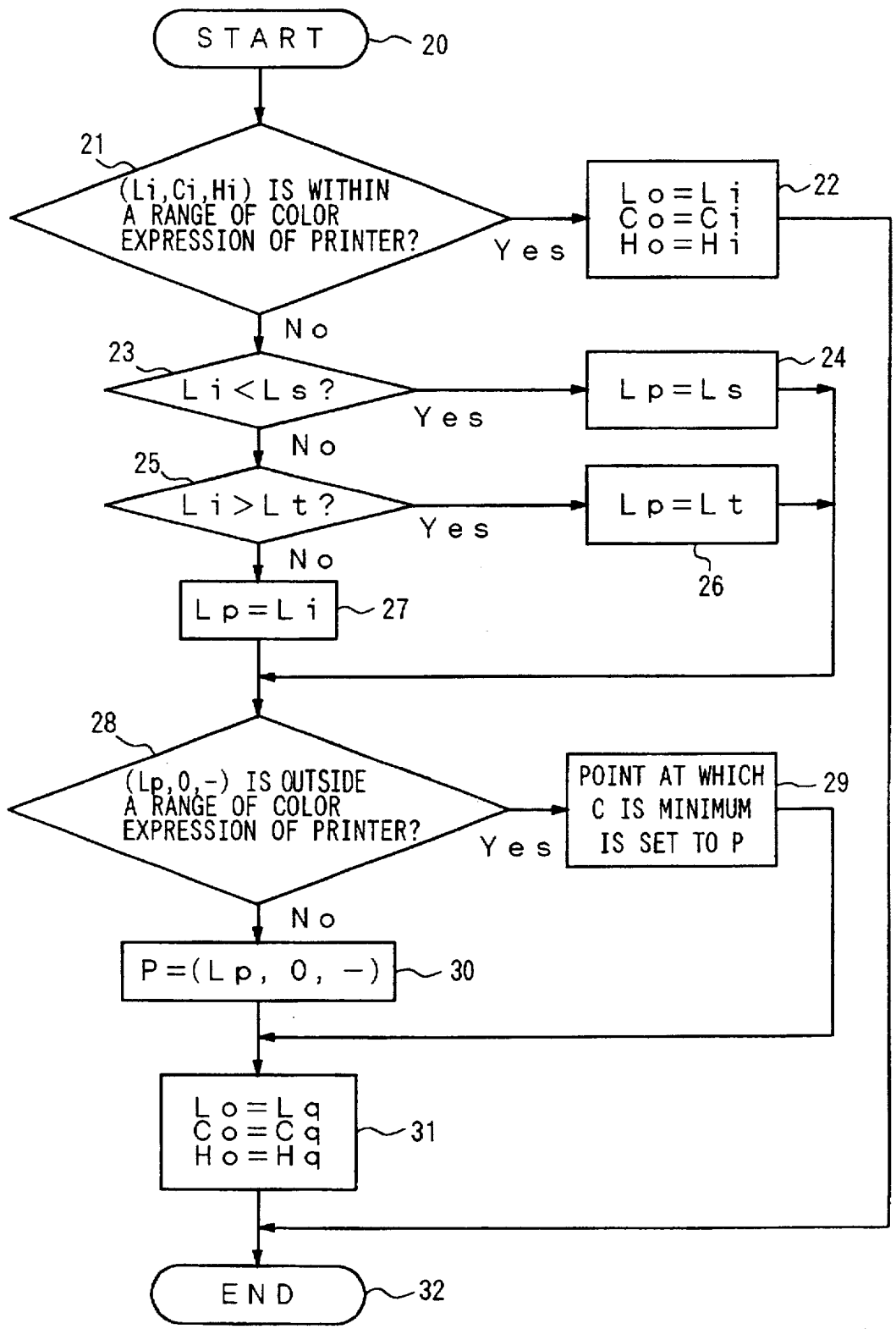
FIG. 6 is a flowchart showing a color correcting method in accordance with an embodiment of the invention.
Figure 7:
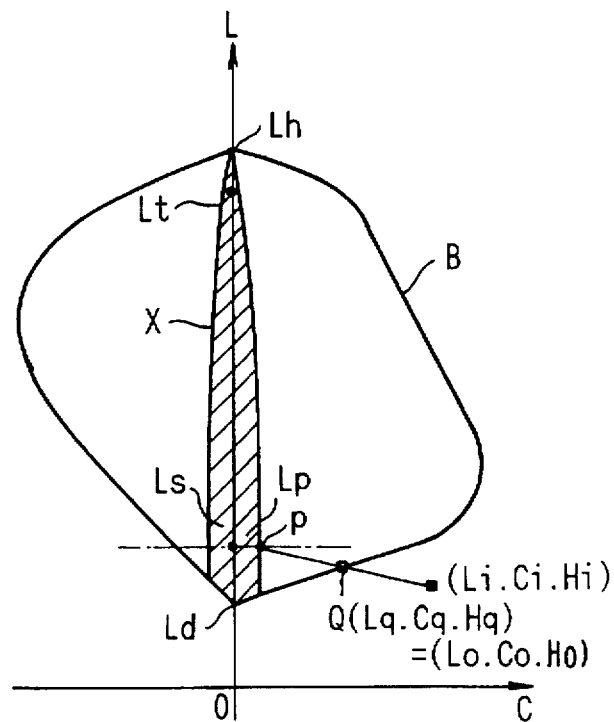
FIG. 7 is a schematic diagram showing an aspect of a color correcting method in the invention.

A method of making the input data to the color printer correspond to the output of the color printer by the lightness Ls as a lower limit and the lightness Lt as an upper limit derived as mentioned above will be described with references to the flowchart of FIG. 6 and the schematic diagram of FIG. 7. Values of the lightness (L), saturation (C), and hue (H) of the image data which is inputted to the color printer are set to (Li, Ci, Hi). Values of the lightness (L), saturation (C), and hue (H) which are outputted by the color printer are set to (Lo, Co, Ho). A point serving as a reference in the case where a conversion is necessary when the input image data is outputted to the color printer is set to a point (P). A temporary reference point to derive the reference point (P) is set to Lp. Although the following process is executed in respect to all of the image data which is inputted, the description appearing hereinafter will pay attention only to a certain specific point (pixel) in the image data.

In step 20, the apparatus is in a start state in which the image data (Li, Ci, Hi) is inputted to the color printer. In step 21, a check is made to see whether or not the input data lies within the color expression range (B) of the color printer. If YES, the processing routine advances to step 22, in which the input data (Li, Ci, Hi) is directly outputted as output data (Lo, Co, Ho), and the processing routine is finished in step 32. When the input data (Li, Ci, Hi) is out of the color expression range of the color printer, the processing routine advances to step 23 in which the relation between the lightness Li of the input data and the lightness Ls as a lower limit is checked.

When Li<Ls is found in step 23, that is, the value of the lightness of the input data is lower than the minimum lightness of the output, the processing routine advances to step 24 in which the temporary reference point Lp is set to Lp=Ls, and further the program advances to step 28. In case Li>Ls is found in step 23, step 25 follows and the relation between the lightness Li of the input data and the lightness Lt as an upper limit is checked.

When Li>Lt is found in step 25, that is, the lightness value of the input data exceeds the maximum lightness of the output the processing routine advances to step 26 in which Lp=Lt is set and the processing routine advances to step 28. When Li≦Lt is found in step 25, step 27 follows while (Ls≦Li≦Lt) is obtained also from the result of step 23. Since the lightness value Li of the input data lies between the upper and lower lightness limits Lt and Ls within the color expression range of the output of the color printer, the temporary reference point Lp is set as Lp=Li in step 27.

In subsequent step 28, a check is made to see whether or not, when the saturation value is set to (C)=0 in the data obtained in above-mentioned step 24, 26, or 27, the resulting data, namely, (Lp, 0, -), lies within the color expression range of the output of the color printer. Such a judgment is made since there is a case where a complete state of the saturation (C)=0 cannot be realized due to the nature of the coloring materials which are used in the color printer and the like. In this case, as shown by a hatched region (X) is FIG. 7, a region outside the color expression range also appears around the saturation value (C)=0. If the data when the saturation (C) is set to 0, that is, (Lp, 0, -) lies within the color expression range of the output of the color printer, step 30 follows and (Lp, 0, -) is set to the reference point (P) for performing a conversion when the input image data is outputted to the color printer. When (Lp, 0, -) is outside the color expression range of the output of the color printer, that is, is within the hatched region (X) shown in FIG. 7, step 29 follows and a point at which the saturation (C) is minimum along the points within the color expression range of the output of the color printer in which L=Lp is set to the point (P).

With above procedure, the point (P) as a reference in case of needing the conversion when the input image data is outputted to the color printer has been determined. A line segment between an end point of the input image data (Li, Ci, Hi) and an end point of the reference point (P) will now be described. An intersection of such segment and the outer edge of the color expression range (B) of the output of the color printer is a point Q (lq, Cq, Hq). The intersection (Q) is a point obtained by making the input data correspond to the color expression range of the output of the color printer, namely, the output data (Lo, Co, Ho) of the color printer for the input image data.

The above-mentioned method is suitable for use where the lightness range of the image data which is inputted to the color printer and the lightness range of the color expression range of the output of the color printer are almost equal and there is a region where the saturation changes largely for the change in lightness in the color expression range of the output. However, when such a method is applied as it is to a case where the lightness range of the input image data is larger than the lightness range of the output data, problems occur, for example, portions which are fully colored in black or white increase in the image outputted from the color printer, the color expression range of the color printer cannot be effectively used, and the like. Even in those cases, however, no pseudo outline appears.

Figure 8:
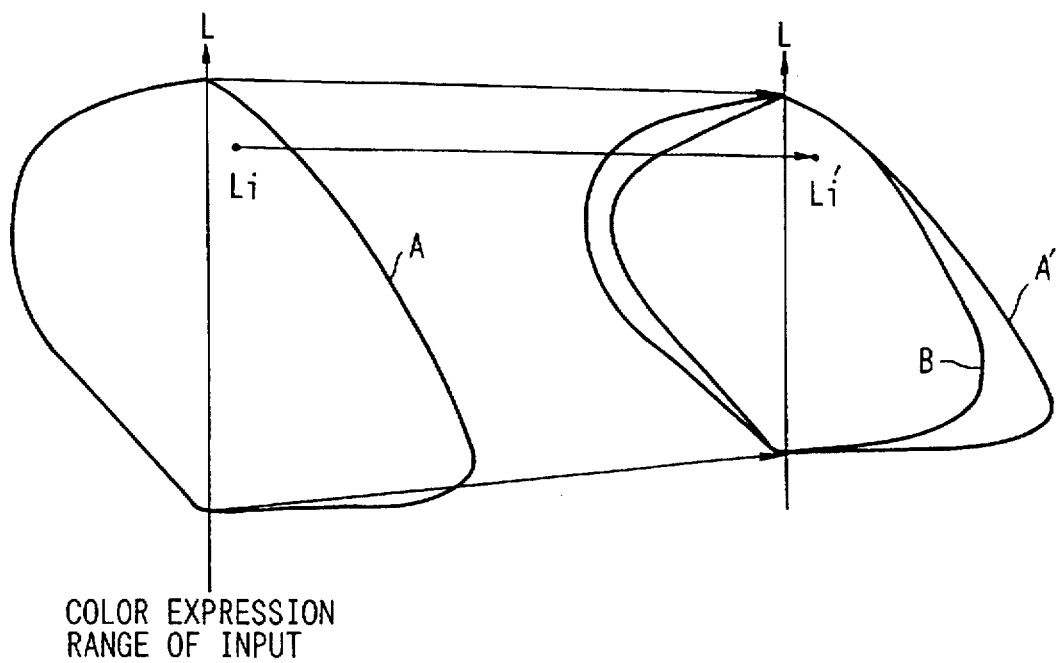
FIG. 8 is a conceptual diagram of a case where a lightness range of an input and a lightness range of an output are first matched.

When the lightness range of the input image data is larger than the lightness range of the output data as mentioned above, there is a case where it is better to apply the invention by first matching the lightness range of the input data with the lightness range of the output data, as in FIG. 8. As a method in such a case, the maximum value of the lightness of the input image data ia set to $L_{max}$ and the minimum value is set to $L_{min}$ and a lightness Li' is obtained by the following expression (3).

$$Li' = \frac{(Lh - Ld)}{(L_{max} - L_{min})} (Li - L_{min}) + Ld \qquad (3)$$

The lightness Li' obtained here is set to the lightness Li of image data which is newly inputted. In other words, the lightness of the color expression range of the input data is converted and compressed so that the axis of the saturation (C) (C=0) is adjusted to the color expression range of the output of the color printer. Whether the conversion of the lightness is executed or not is decided by a subjective evaluation by actually printing out a number of images. In this case, although the values of the lightness of the input data and output data are different, the values of the saturation are equal and the values of the hue also coincide.

Figure 9:
FIG. 9 is a schematic diagram showing an apparatus according to an embodiment of the invention.

An embodiment of the invention will now be described with reference to FIG. 9 where the color correcting method according to the invention is generally shown to be executed on a host computer 40 such as a personal computer. A color printer 41 which can perform color printing, such as, a laser beam printer, an ink jet type printer, a thermal transfer type printer, or the like, is connected to the host computer 40. It is, at this point, assumed that the input/output characteristics of the color printer 41 have already been made known to the host computer 40 by a previous measurement or the like. The input/output characteristics of the color printer 41 indicate the relation between the RGB or CMYK (cyan, magenta, yellow, black) data of the input image data and the data (L, C, H) of the printed matter outputted by the color printer 41.

The host computer 40 obtains the (L, C, H) values of the output of the color printer 41 connected thereto from the (L, C, H) values of the image data which is inputted to the color printer 41 by using the above-mentioned color correcting method. The host computer 40 outputs to the color printer 41 the RGB or CMYK data corresponding to the (L, C, H) values of the output of the color printer 41.

Figure 10:
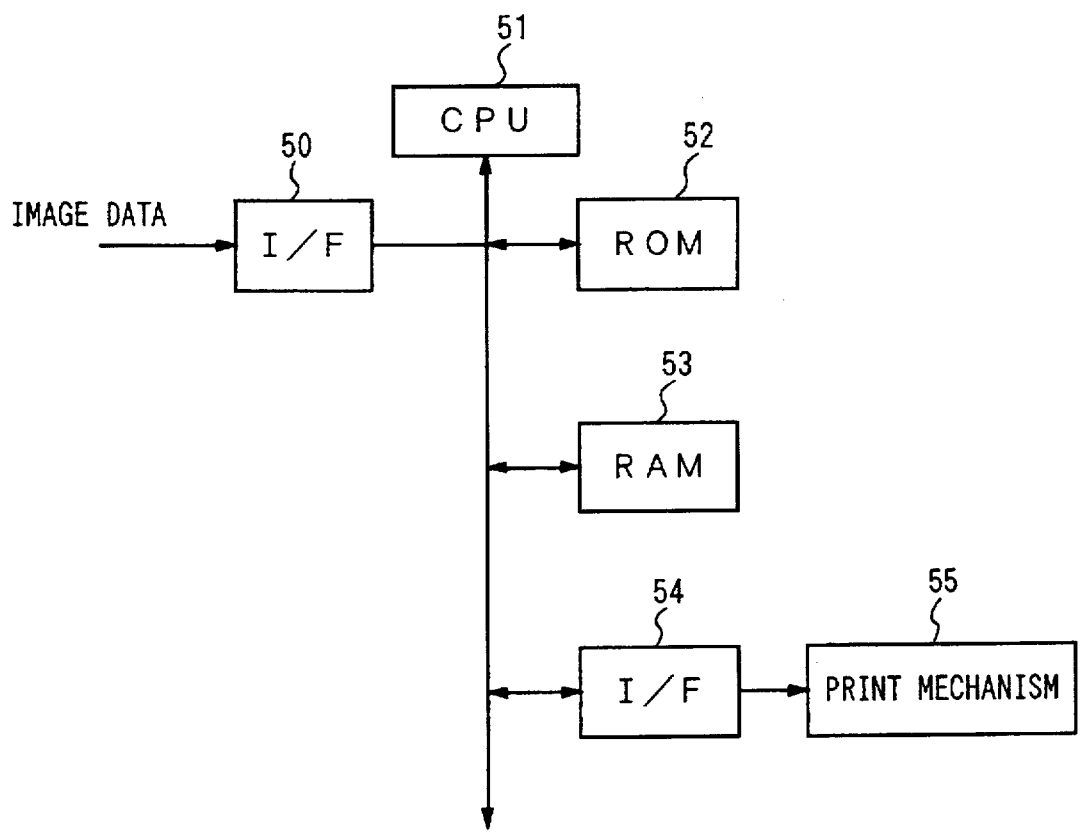
FIG. 10 is a schematic diagram showing an apparatus according to another embodiment of the invention.

The realization of the above-mentioned color correcting method of the color printer 41 will now be described with reference to FIG. 10 in which only the main components necessary to realize the foregoing color correcting method of the color printer are shown. More particularly, an input interface 50 is shown connected to a CPU 51 comprising a microcomputer, a ROM 52, a RAM 53,and an output interface 54, respectively. The output interface 54 is connected to a printing mechanism 55.

Image data inputted to the color printer 41 is read by the CPU 51 through the input interface 50. A program for data converting according to the foregoing color correcting method has been written in the ROM 52. Input/output characteristics of the color printer have been preliminarily made known by a previous measurement or the like and the data regarding such input/output characteristics have been written in the ROM 53.

The CPU 51 obtains the (L, C, H) values of data which is generated by the printing mechanism 55 of the color printer from the (L, C, H) values of the image data inputted to the color printer on the basis of the input data from the input interface 50, the input/output characteristics written in the ROM 53, and the data converting method program written in the ROM 52, the CPU 51 outputs the RGB or CMYK data corresponding to the (L, C, H) values of the data which is outputted to the printing mechanism 55.

According to the above-mentioned color correcting method, even in the region where the saturation largely changes for a relatively small change in lightness in the color expression range of the output of the color printer, since the image output is adapted to a change in data which is inputted, the color correction can be performed with any unnaturalness suppressed.

The present invention is not limited to the foregoing embodiment but many modifications and variations may be made therein by a person skilled in the art without departing from the spirit and scope of the invention as defined in the appended claims.

What is claimed is:

1. A correcting method for a color printer having a color expression range which is expressed by lightness, saturation, and hue, said correcting method comprising the steps of:

comparing input image data which is expressed by lightness, saturation, and hue with said color expression range of the color printer;

using said input image data as output data for said color printer in respect to a portion of said input image data which, in said comparing, is found to overlap with the color expression range of said color printer;

with respect to another portion of the input image data which does not overlap the color expression range of the color printer, forming respective output data for said color printer by changing the lightness of said other portion of the input image data to a point on the outer edge of the color expression range of the color printer; and when the lightness of the input image data is larger than the lightness of the image that can be outputted from said color printer, obtaining a lightness Li' by correcting a lightness Li of the input image data in accordance with the following expression in which a maximum value of the lightness of the input image data is set to Lmax, a minimum value of said lightness is set to Lmin, an upper limit of the color expression range of said color printer is set to Lh, and a lower limit is set to Ld:

$$Li' = \frac{(Lh - Ld)}{(L_{max} - L_{min})} (Li - L_{min}) + Ld$$

2. A color correction method for a color printer having a color expression range expressed by lightness, saturation and hue within a perimeter including one region between upper and lower lightness limits where changes in lightness correspond to relatively small changes in saturation and other regions above and below said upper and lower lightness limits, respectively, where said changes in lightness correspond to relatively large changes in saturation, said color correction method comprising the steps of:

comparing said color expression range of said color printer with input image data having a color expression range which is similarly expressed by lightness, saturation, and hue and which includes first and second portions situated within and outside of, respectively, said perimeter of said color expression range of the color printer;

using said input image data as output data for said color printer in respect to said input image data which, in said comparing, is found to be in said first portion of the color expression range of said input image data which is within said perimeter of the color expression range of said color printer;

with respect to said input image data which, in said comparing, is found to be in said second portion of the color expression range of the input image data which is outside said perimeter of the color expression range of said color printer, forming respective modified output data for said color printer by changing the lightness of said input image data which is outside said perimeter to that of a point on said perimeter of said color expression range of the color printer;

when said lightness of the input image data which is outside said perimeter is above said upper lightness limit, said point on said perimeter of the color expression range of the color printer is situated at an intersection with said perimeter of a line extending from a point representing said input image data which is outside said perimeter to a point where the lightness is said upper limit and the saturation is zero; and when said lightness of the input image data which is outside said perimeter is below said lower lightness limit, said point on the perimeter of said color expression range is situated at an intersection with said perimeter of a line extending from a point representing said input image data which is outside said perimeter to a point where the lightness is said lower limit and the saturation is zero.

3. A color correction method according to claim 2; wherein, when the lightness of the input image data is larger than the lightness of an image outputted from said printer, the lightness of the input image data is corrected by matching the zero axis of the saturation of said input image data with the color expression range of said color printer.

4. A color correction method for a color printer having a color expression range expressed by lightness, saturation and hue within a perimeter including one region between upper and lower lightness limits where changes in lightness correspond to relatively small changes in saturation and other regions above and below said upper and lower lightness limits, respectively, where said changes in lightness correspond to relatively large changes in saturation, said color correction method comprising the steps of:

comparing said color expression range of said color printer with input image data having a color expression range which is similarly expressed by lightness, saturation, and hue and which includes first and second portions situated within and outside of, respectively, said perimeter of said color expression range of the color printer;

using said input image data as output data for said color printer in respect to said input image data which, in said comparing, is found to be in said first portion of the color expression range of said input image data which is within said perimeter of the color expression range of said color printer;

with respect to said input image data which, in said comparing, is found to be in said second portion of the color expression range of the input image data which is outside said perimeter of the color expression range of said color printer, forming respective modified output data for said color printer by changing the lightness of said input image data which is outside said perimeter to that of a point on said perimeter of said color expression range of the color printer;

when said lightness of the input image data which is outside said perimeter is above said upper lightness limit, said point on said perimeter of the color expression range of the color printer is situated at an intersection with said perimeter of a line extending from a point representing said input image data which is outside said perimeter to a point where the lightness is said upper limit and the saturation is zero;

when said lightness of the input image data which is outside said perimeter is below said lower lightness limit, said point on the perimeter of said color expression range is situated at an intersection with said perimeter of a line extending from a point representing said input image data which is outside said perimeter to a point where the lightness is said lower limit and the saturation is zero; and wherein when said lightness of the input image data is larger than the lightness of the image outputted from said printer, a lightness Li' obtained by correcting a lightness Li of the input image data is formed by using the following expression in which a maximum value of the lightness of the input image data is set to Lmax, a minimum value of said lightness of the input image data is set to Lmin, an upper limit of the color expression range of said color printer is set to Lh, and a lower limit is set to Ld:

$$Li' = \frac{(Lh - Ld)}{(L_{max} - L_{min})} (Li - L_{min}) + Ld$$

5. A printing apparatus comprising:

color printing means for executing color printing and having a color expression range expressed by lightness, saturation, and hue within a perimeter including one region between upper and lower lightness limits where changes in lightness correspond to relatively small changes in saturation and other regions above and below said upper and lower lightness limits, respectively, where said changes in lightness correspond to relatively large changes in saturation; and signal processing means including means for comparing said color expression range of said color printing means with input image data having a color expression range which is similarly expressed by lightness, saturation, and hue and which includes first and second portions situated within and outside of, respectively, said perimeter of said color expression range of the color printing means; means for supplying, as output data for said color printing means, said input image data found by said means for comparing to be in said first portion of the color expression range of said input image data which is within said perimeter of the color expression range of said color printing means; means for forming modified output data for said color printing means corresponding to said input image data which, in said comparing, is found to be in said second portion of the color expression range of the input image data which is outside said perimeter of the color expression range of said color printing means by changing the lightness of said input image data in said second portion of the color expression range of said input image data to that of a point on said perimeter of said color expression range of the color printing means; said point on said perimeter of the color expression range of said color printing means being situated at an intersection with said perimeter of a line extending from a point representing said input image data which is outside said perimeter to a point where the lightness is said upper limit and the saturation is zero when said lightness of said input image data outside said perimeter is above said upper lightness limit; and, when said lightness of said input image data outside said perimeter of the color expression range of the color printing means is below said lower lightness limit, said point on the perimeter of said color expression range is situated at an intersection with said perimeter of a line extending from a point representing said input image data which is outside said perimeter to a point where the lightness is said lower limit and the saturation is zero.

6. A printing apparatus according to claim 5; wherein said signal processing means further includes means operative, when the lightness of the input image data is larger than the lightness of an image outputted from said color printing means, for further correcting said input image data by matching the zero axis of the saturation of said input image data with the corresponding axis of the color expression range of said color printing means.

7. A printing apparatus comprising:

color printing means for executing color printing and having a color expression range expressed by lightness, saturation, and hue within a perimeter including one region between upper and lower lightness limits where changes in lightness correspond to relatively small changes in saturation and other regions above and below said upper and lower lightness limits, respectively, where said changes in lightness correspond to relatively large changes in saturation; and signal processing means including means for comparing said color expression range of said color printing means with input image data having a color expression range which is similarly expressed by lightness, saturation, and hue and which includes first and second portions situated within and outside of, respectively, said color expression range of the color printing means; means for supplying, as output data for said color printing means, said input image data found by said means for comparing to be in said first portion of the color expression range of said input image data which is within said perimeter of the color expression range of said color printing means; means for forming modified output data for said color printing means corresponding to said input image data which, in said comparing, is found to be in said second portion of the color expression range of the input image data which is outside said perimeter of the color expression range of said color printing means by changing the lightness of said input image data in said second portion of the color expression range of said input image data to that of a point on said perimeter of said color expression range of the color printing means; said point on said perimeter of the color expression range being situated at an intersection with said perimeter of a line extending from a point representing said input image data which is outside said perimeter to a point where the lightness is said upper limit and the saturation is zero when said lightness of said input image data is above said upper lightness limit; and, when said lightness of said input image data outside said perimeter of the color expression range of the color printing means is below said lower lightness limit, said point on the perimeter of said color expression range is situated at an intersection with said perimeter of a line extending from a point representing said input image data which is outside said perimeter to a point where the lightness is said lower limit and the saturation is zero; and means operative, when said lightness of the input image data is larger than the lightness of an image outputted from said color printing means, for obtaining a lightness Li' by correcting a lightness Li of the input image data in accordance with the following expression in which a maximum value of the lightness of the input image data is Lmax, a minimum value of said lightness of the input image data is Lmin, an upper limit of the color expression range of said color printer is Lh, and a lower limit is Ld:

$$Li' = \frac{(Lh - Ld)}{(L_{max} - L_{min})} (Li - L_{min}) + Ld$$

* * * * *